(12) United States Patent
Ghosh

(10) Patent No.: US 12,105,851 B2
(45) Date of Patent: Oct. 1, 2024

(54) SECURE DATA CENTER UPDATE AND MONITORING

(71) Applicant: Hewlett Packard Enterprise Development LP, Houston, TX (US)

(72) Inventor: Debdipta Ghosh, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 335 days.

(21) Appl. No.: 17/486,288

(22) Filed: Sep. 27, 2021

(65) Prior Publication Data

US 2023/0026057 A1     Jan. 26, 2023

(30) Foreign Application Priority Data

Jul. 21, 2021   (IN) .............................. 202141032869

(51) Int. Cl.
| | | |
|---|---|---|
| *G06F 21/64* | (2013.01) | |
| *G06F 8/65* | (2018.01) | |
| *G06F 21/55* | (2013.01) | |
| *G06F 21/56* | (2013.01) | |
| *G06F 21/60* | (2013.01) | |

(52) U.S. Cl.
CPC ............... *G06F 21/64* (2013.01); *G06F 8/65* (2013.01); *G06F 21/552* (2013.01); *G06F 21/566* (2013.01); *G06F 21/602* (2013.01)

(58) Field of Classification Search
None
See application file for complete search history.

(56) References Cited

U.S. PATENT DOCUMENTS

| 11,212,077 | B2 * | 12/2021 | Ma ...................... G06F 16/2246 |
|---|---|---|---|
| 2003/0131085 | A1 | 7/2003 | Zhang et al. |
| 2012/0311111 | A1 | 12/2012 | Frew et al. |
| 2014/0123292 | A1 * | 5/2014 | Schmidt .................. H04L 67/10 726/25 |
| 2016/0294559 | A1 * | 10/2016 | Dabak ................. G06F 9/45558 |
| 2017/0034023 | A1 * | 2/2017 | Nickolov ............ H04L 43/0817 |
| 2018/0096121 | A1 * | 4/2018 | Goeringer ............. G06F 21/316 |
| 2020/0267187 | A1 * | 8/2020 | Singh ...................... G06F 21/57 |
| 2021/0073426 | A1 | 3/2021 | Eriksson et al. |

FOREIGN PATENT DOCUMENTS

WO    WO-2017187395 A1 *  11/2017   ............. G06F 21/00

\* cited by examiner

*Primary Examiner* — Bassam A Noaman
(74) *Attorney, Agent, or Firm* — Trop, Pruner & Hu, P.C.

(57) ABSTRACT

A system hash for each production system is generated. Each system hash includes a concatenation of a hardware hash and a software hash of each production system in the datacenter. A datacenter hash tree is created based on a combination of the system hashes. A test copy of the software hash of each of the production systems is created in respective test systems in the datacenter. In response to detecting a change in the datacenter hash tree, a modification in a system hash which resulted in the change is identified. The central copy of the software hash is compared with the test copy of the software hash. In response to a mismatch between the central copy and the test copy, occurrence of an unauthorized attack in a software of the production system is detected.

16 Claims, 5 Drawing Sheets

SECURE DATA CENTER UPDATE AND MONITORING

BACKGROUND

Service providers and manufacturers are challenged to deliver quality and value to consumers, for example by providing access to computing capabilities. A data center is a facility used to house computer networks, computer systems, and associated components, such as telecommunications and storage systems. Data centers, offices, etc. can be end locations for computing devices manufactured by a manufacturer.

A data center is a facility used to house computer networks, computer systems, and associated components, such as telecommunications and storage systems. The data center may include core components, such as hardware equipment and software for data processing operations and storage of data and applications. The core components may include storage systems; servers; network infrastructure, such as switches and routers; and information security elements, such as firewalls. The data center also includes support infrastructure which include equipment for securely sustaining the highest availability possible for the core components. The support infrastructure may include Uninterruptible Power Sources (UPS), such as battery banks, generators and redundant power sources, environmental control, such as computer room air conditioners (CRAG); heating, ventilation and air conditioning (HVAC) systems, and exhaust systems and physical security systems, such as biometrics and video surveillance systems.

BRIEF DESCRIPTION OF THE DRAWINGS

The following detailed description references the drawings, wherein.

DETAILED DESCRIPTION

Figure 1:
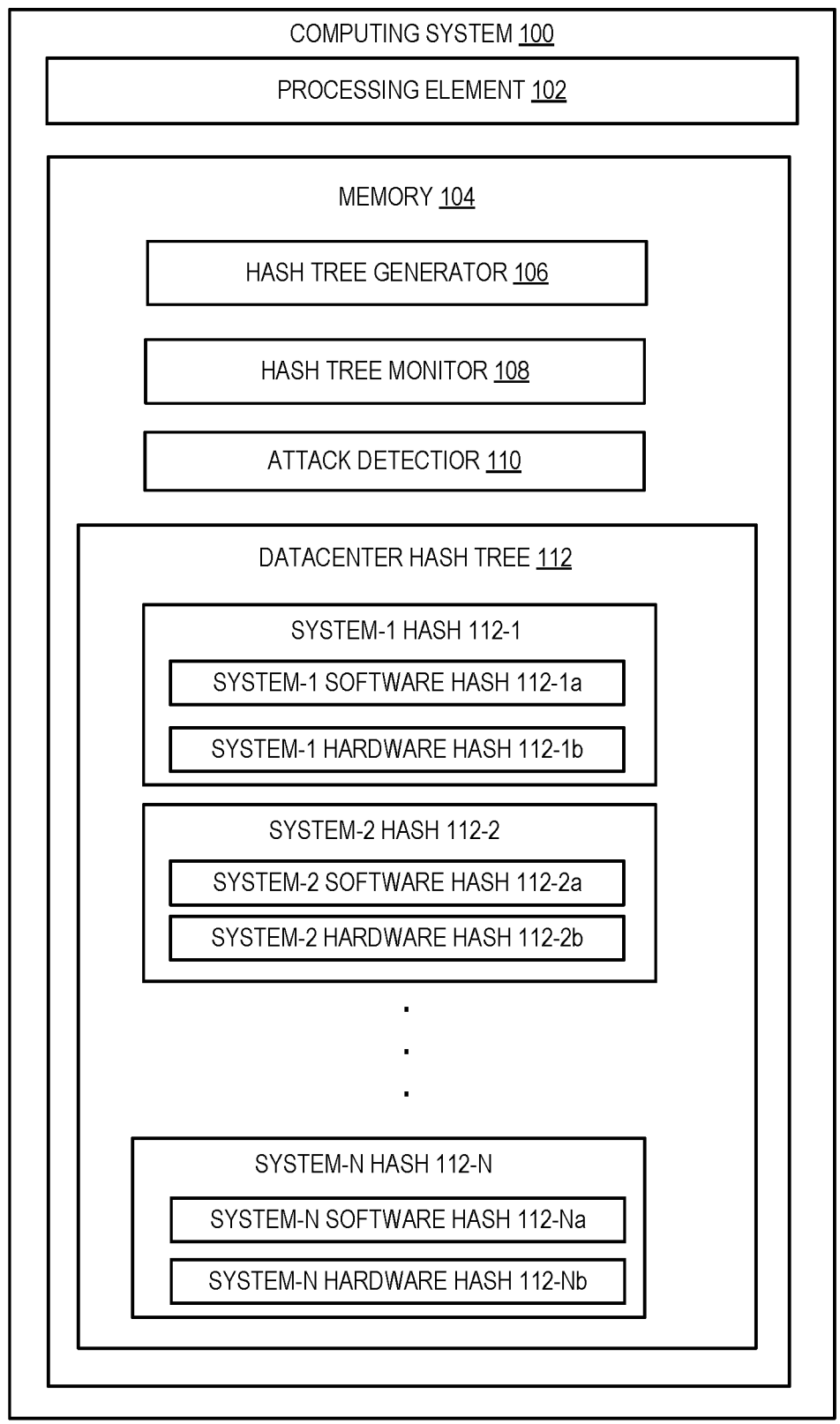
FIG. 1 is a block diagram of a computing system 100 for securing a data center, according to various examples.

Core components in a data center may include multiple production systems, such as servers, network switches/gateways, and Internet of Things (IoT) devices. The production systems include IT equipment in the data center which are operated for compute, storage, and network functions. The production systems may run different software including Operating systems, Applications, Drivers, and System firmware.

Software running in the production systems may be updated from time to time when a new version of the software is released by a vendor. Newly released software is generally tested on test systems before installing them in the production systems. The data center may include tests systems corresponding to the production systems. The tests systems may be replicas of the production systems. For example, a data center may include a production server; a production switch, and a production IoT device; as production systems. Corresponding to these production systems, the data center also includes a test server, a test switch, and a test IoT device, as test systems. The tests systems may have a similar configuration and may perform functionalities similar to their corresponding production systems. For example, the test server may perform similar functionalities as that of the production server, the test switch may perform similar functionalities as that of the production switch, and so on.

When a software update is released for a production system, the software update is first loaded in a corresponding test system for testing. Before the software update is installed in the production system, specific tests are performed to ensure that there are no defects or bugs in the software update. In general; the software update is run in the test system corresponding to the production system for which the software update is released. For example, if a software update of a firmware is released for a production server in the data center, a test server corresponding to the production server may run the software update and check for defects. Once the software update is successfully tested, the test system may load the software update in the production system through a secure channel.

However, there could be chances of security breach in the production system even after the software update. Security breach in the production system may occur due to software or hardware intrusions which may load malicious software in the production systems and thereby adversely affect functioning of the production system. Thus, integrity of the tested software loaded in the production systems may be compromised due to unauthorized intrusions/malicious attacks and the production systems may not operate as intended.

In some examples, a production system, such as a server, in the data center may include a Trusted Platform Module (TPM) which is a secure crypto-processor including a dedicated microcontroller which securely stores passwords, certificates, immutable digital fingerprints, or encryption keys to authenticate a platform, such as the server. In some examples, TPMs provide for remote attestation thereby allowing a third party to verify that the software has not been changed/altered after the tested software is loaded in the production systems. Thus, different TPM-based techniques may be used to secure the production systems.

However, there are some production systems, such as IoT devices, which may not have TPM chips installed in them. Also, other devices with small form factor may not provide adequate space for installation of TPM chips. Thus, a TPM-based security measure may not be feasible with some devices installed in a data center. As a consequence, securing firmware/software running in such devices may be challenging.

Approaches described herein discuss mechanisms to monitor and secure software running in production systems without using a TPM. In an example, a system according to the present disclosure may generate a plurality of system hashes. A system hash is a concatenation of a hardware hash and a software hash of a production system in the data center. The software hash of each of the production system is indicative of a cryptographic hash of software information of the production system and the hardware hash of the production system is indicative of a cryptographic hash of hardware information of the production system. The system creates a data center hash tree based on a combination of the plurality of system hashes. The data center hash tree includes a central copy of the software hash and a central copy of the hardware hash of each of the plurality of production systems. The central copy of the software hash and the central copy of the hardware hash of each of the production systems form leaf nodes of the data center hash tree.

Further, the system creates a test copy of the software hash of each of the plurality of production systems in respective test systems in the data center. In response to detecting a change in the data center hash tree, the system identifies a modification in a system hash from the plurality of system hashes which resulted in the change. The system further determines that the modification is in a central copy of the software hash of a production system among the plurality of production systems and compares the central copy of the software hash with the test copy of the software hash. In response to a mismatch between the central copy of the software hash and the test copy of the software hash, the system may detect occurrence of an unauthorized attack in a software of the production system. Thus, the system may detect an unauthorized attack on the software running in the production systems and may raise an alert to a system administrator. Based on the alert, the system administrator may undertake corrective actions to prevent unauthorized modifications to the software or may reload tested and approved software in the production system. Thus, security breach in the production systems may be detected and integrity of the software loaded in the production systems may be maintained.

FIG. 1 is a block diagram of a computing system 100 for securing a data center, according to various examples. Computing system 100, also referred to as system 100, includes a processor 102 and a memory 104 that may be coupled to each other through a communication link (e.g., a bus). Processor 102 may include a single or multiple Central Processing Units (CPU) or another suitable hardware processor(s), such as an ASIC, Memory 104 may be a machine-readable storage medium that may store machine readable instructions executed by processor 102. Memory 104 may include any suitable combination of volatile and/or non-volatile memory, such as combinations of Random Access Memory (RAM), Read-Only Memory (ROM), flash memory, and/or other suitable memory.

Memory 104 stores instructions to be executed by processor 152 including instructions for hash tree generator 106, hash tree monitor 108, and attack detector 110.

In some examples, a data center may include a plurality of production systems, such as production system-1, production system-2, . . . , production system-N. The processor 102 may execute hash tree generator 106 to generate system hashes for each of the production systems. In an example, the processor 102 may execute hash tree generator 106 to generate a software hash and a hardware hash for production system-1. The hash tree generator 106 may capture version information of different firmware or drivers associated with hardware of production system-1. A hash value of the version information of one or more firmware or drivers associated with the production system-1 may be referred to as the software hash of the production system-1. Similarly, a hash value of the version information of one or more firmware or drivers associated with the production system-2 may be referred to as the software hash of the production system-2, and so on.

In an example, the production system-1 may be a rack server. The production system-1 may include a rack management controller (RMC) which may store firmware update (FWU) information including version number, serial number and/or part number of a latest firmware update of the rack server. The hash tree generator 106 may generate a cryptographic hash value of the FWU information. Thus, the processor 102 may execute the hash tree generator 106 to generate system-1 software hash 112-1a of the production system-1 which is a cryptographic hash of software information of the production system-1. In an example, the cryptographic hash may be generated using Secure Hash Algorithm 1 (SHA1). Although, version information of FWU in the RMC is considered as example software component for generation of the software hash, in an example, other software/firmware components of the production system-1 may be used to generate the system-1 software hash 112-1a.

In an example, the production system-1 may include hardware components such as a power supply unit (PSU), a peripheral component interconnect express (PCIE) slot, dual in-line memory module (DIMM), motherboard, etc. The hash tree generator 106 may use serial numbers/part numbers of the hardware components and generate a cryptographic hash of this hardware information of the production system-1, i.e., system-1 hardware hash 112-1b. Although, PSU, DIMM, FOIE slot, and the motherboard are considered as example hardware components for generation of the hardware hash, in an example, other components of the production system-1 may be used to generate the system-1 hardware hash 112-1b.

The processor 102 may execute the hash tree generator 106 which may concatenate the system-1 software hash 112-1a and the system-1 hardware hash 112-1b of the production system 1 to generate a system-1 hash 112-1. Similarly, system-2 hash 112-2 for production system-2, system N hash 112-N for production system N may be generated. Although, a rack server is considered as an example of production system-1, other hardware components, such as a network switch, an IoT device, etc., in a data center may be considered for generation of system hashes.

Figure 2:
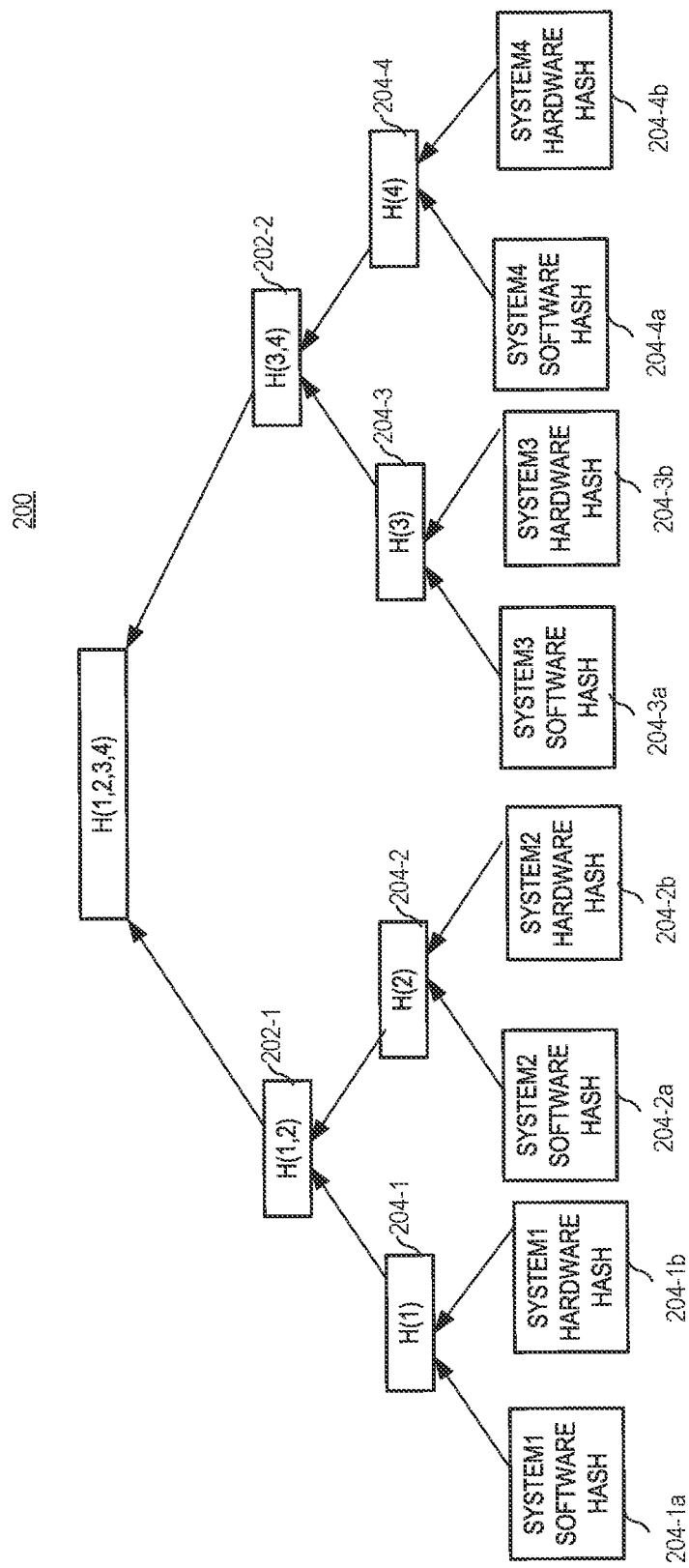
FIG. 2 illustrates generation of the data center hash tree according to an example.

Further, the processor may execute hash tree generator 106 to concatenate system-1 hash 112-1, system-2 hash 112-2, and system N hash 112-N. As a result of the concatenation of the system hashes of respective production systems 1 to N, data center hash tree 112 is generated. FIG. 2 illustrates generation of the data center hash tree according to an example. In the example of FIG. 2, the data center is considered to include production systems 1 to 4, i.e., N=4. In an example, the data center may include more than four or less than four production systems. In an example, the production systems 1 and 2 are rack servers, production system-3 is a network switch, and production system-4 is an IoT device. As explained previously, the processor 102 may execute hash tree generator 106 to generate system-1 software hash 204-1a, system-1 hardware hash 204-1b, system-2 software hash 204-2a, system-2 hardware hash 204-2b, and so on. In an example, the hash tree generator 106 performs a hash of the concatenation of system-1 software hash 204-1a and system-1 hardware hash 204-1b to obtain the system-1 hash denoted as H(1) 204-1. Similarly, system-2 hash H(2) 204-2, system-3 hash H(3) 204-3, and system-4 hash H(4) 204-4 may be generated by hashing the concatenation of system-2 software hash 204-2a and system-2 hardware hash 204-2b; system-3 software hash 204-3a and system-3 hardware hash 204-3b; and system-4 software hash 204-4a and system-4 hardware hash 204-4b, respectively.

Thus, system-1 software hash 204-1a and system-1 hardware hash 204-1b are child nodes of system-1 hash H(1) 204-1; system-2 software hash 204-2a and system-2 hardware hash 204-2b are child nodes of system-2 hash H(2) 204-2; and so on. Further, the system-1 software hash 204-1a and system-1 hardware hash 204-1b; system-2 software hash 204-2*a* and system-2 hardware hash 204-2*b*; system-3 software hash 204-3*a* and system-3 hardware hash 204-3*b*; and system-4 software hash 204-4*a* and system-4 hardware hash 204-4*b* form leaf nodes of the data center hash tree 200. A node in a hash tree which does not have any child nodes is referred to as a leaf node.

The processor 102 may execute hash tree generator 106 to designate software hashes 204-1*a* to 204-4*a* and hardware hashes 204-1*b* to 204-4*b* of the production systems in the data center as central copies of the hashes. Thus, system-1 software hash 204-1*a* is designated a central copy of the software hash of the production system-1 and system-1 hardware hash 204-1*b* is designated a central copy of the hardware hash of the production system-1. Designating the system-1 software hash 204-1*a* and the system-1 hardware hash 204-1*b* as central copies includes defining privileges for accessing and/or modifying the system-1 software hash 204-1*a* and the system-1 hardware hash 204-1*b*. The central copies may be accessed and/or modified only by the system 100. The software and hardware hashes of each of the production systems which form leaf nodes of the data center hash tree 200 may be designated as central copies. The hash tree generator 106 may hash the concatenation of H(1) and H(2) to generate H(1,2) 202-1 and the concatenation of H(3) and H(4) to generate H(3,4) 202-2. H(1,2,3,4) represents the data center hash tree and is generated by hashing the concatenation of H(1,2) and H (3,4).

Further, the processor 102 may execute hash tree generator 106 to create a test copy of the software hash of each of the production systems 1 to 4. The test copy of the system-1 software hash refers to a duplicate of the central copy of the system-1 software hash 204-1*a*. The test copy is stored and maintained in a test system-1 corresponding to the production system-1, Thus, a test copy corresponding to the software hashes of each of the production system 1 to 4 may be created and stored in respective test systems. The test copies are private to the respective test systems in which they are stored and cannot be accessed by the production systems. In an example, there may be a single test system for multiple production systems of identical type. For example, there may be a single test server corresponding to hundred production servers or a single test switch corresponding to fifty production switches. Thus, a test copy corresponding to the software hashes of production systems of the same type may be created and stored in the test system of a respective type.

The processor 102 may execute hash tree monitor 108 to detect changes in the data center hash tree 112 or 200. In an example, system-1 software hash 204-1*a* may get modified due to an alteration in the software of system-1 because of a malicious attack. In case of any modification in the software/firmware of production system-1, the central copy of the system-1 software hash 204-1*a* may be modified and the same may be reflected in the data center hash tree 112 or 200. For example, if there is a modification in the system-1 software hash 204-1*a*, value of H(1) at node 204-1 gets modified. As a consequence of change in value of H(1), value of H(1,2) at node 202-1 gets modified which leads to a change in the top of the hash tree H(1,2,3,4). In an example, the hash tree monitor 108 may periodically check if the value of H(1,2,3,4) has changed. In response to identifying that there is a change in the value of H(1,2,3,4), the hash tree monitor 108 may identify that a change in the leaf node 204-1*a* resulted in the change in H(1,2,3,4). Thus, the hash tree monitor 108 may identify that a modification in a system hash, e.g., the system-1 hash 204-1*a*, has resulted in the change in the data center hash tree 200. Further, based on the identification of the change in system-1 hash 204-1*a*, the processor 102 may execute the hash tree monitor 108 to determine that the modification is in a central copy of the software hash, i.e., the central copy of system-1 software hash 204-1*a* in this example, of the production system-1.

In response to identifying that the central copy of the system-1 software hash 204-1*a* is modified, the processor 102 may execute attack detector 110 to compare the central copy with its corresponding test copy. In response to a match between the central copy of the software hash and the test copy of the software hash, the change is approved. The attack detector 110 determines that the change is an authorized change and there is no attack to the production system 1. In response to a mismatch between the central copy of the system-1 software hash 204-1*a* and the test copy of the system-1 software hash, attack detector 110 may detect occurrence of an unauthorized attack in a software of the system 1.

In another example, the processor 102 may execute attack detector 110 to determine that the modification is in a central copy of the hardware hash of a production system, such as the central copy of system-1 hardware hash 112-1*b*. Since, the hardware hash is modified, the attack detector 110 may determine occurrence of an unauthorized attack to hardware of the production system-1. Similarly, an unauthorized attach to hardware of other production systems may also be detected.

Figure 3:
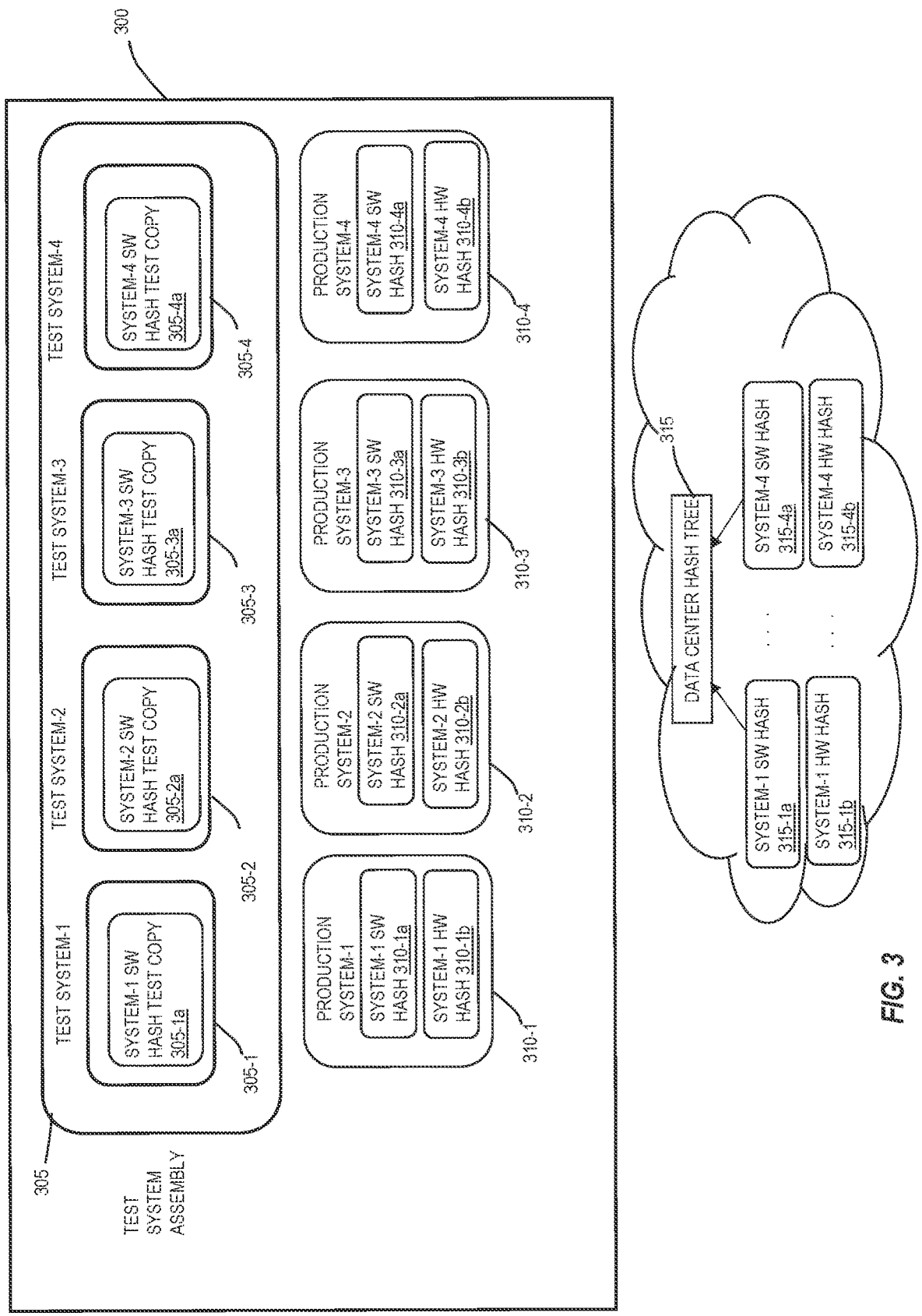
FIG. 3 illustrates a test system assembly included in a data center according to an example.

FIG. 3 illustrates a test system assembly 305 included in a data center 300 according to an example. The test system assembly 305 includes a plurality of test systems 305-1 to 305-4 associated with respective production systems 310-1 to 310-4, also referred to as production systems 310, in the data center 300. Test system-1 305-1 corresponds to production system-1 310-1, test system-2 305-2 corresponds to production system-2 310-2, and so on. The test system-1 305-1 may execute similar functionalities as the production system-1 310-1, test system-2 305-2 may execute similar functionalities as the production system-2 310-2, and so on.

Data center hash tree 315, as shown in FIG. 3 is similar to data center hash tree 112 or 200. Data center hash tree 315 is formed by a combination of software and hardware hash of production systems 310. In the illustration of FIG. 3, the terms "hardware" and "software" are abbreviated as "HW" and "SW", respectively. In an example, the data center hash tree 315 may be created by the computing system 100 of FIG. 1. Data center hash tree 315 may be stored in a central location accessible by the test system assembly 305 and the production systems 310. In an example, the data center hash tree 315 may be stored in a cloud storage.

The test system assembly 305 may receive a software update for a production system. The software update may include an update in the firmware or an application running in one of the production systems 310. The software update that is released may be loaded in the test system assembly 305. In an example, a software update for production system-1 310-1 may be released. In response to receiving the software update, the test system assembly 305 may designate test system-1 305-1 corresponding to the production system-1 310-1 as an active test system and other test systems, viz. test system-2 305-2 to test system-4 305-4 as support test systems. Thus, in response to receiving a software update for a production system, the test system assembly 305 may designate a test system associated with the production system as an active test system and other tests systems as a set of support test systems.

Further, in the example, the active test system 305-1 may test the software update based on predefined rules. The predefined rules may be specified in the active test system 305-1. In an example, multiple diagnostic tests may be performed on the software update in the active test system 305-1. The active test system 305-1 may generate test results which may include logs identifying the errors during testing of the software update. Each log may include a timestamp, an operation performed, and a status of the operation, i.e., successful, failed, alert, etc. The status may include flags identifying warnings/alerts generated during execution of the software update in the active test system 305-1. In an example, the flags may indicate severity, such as major, minor, etc. of a warning/alert generated during execution of the software update in the active test system 305-1.

In response to completion of the test, the active test system 305-1 may distribute test results with the set of support test systems 305-2 to 305-4. The test results may include the flags indicating severity of the warning/alert generated during execution of the software update in the active test system 305-1, Each of the support test systems 305-2 to 305-4 may analyze the test results. In an example, each of the support test systems 305-2 to 305-4 may check for "major" flags identifying serious faults or errors in execution of the software update. In an example, based on the "major" flags in the test result, the support test systems 305-2 to 305-4 may detect presence of bugs in the software update and may reject the software update.

In an example, the support test systems may determine that there are no "major" flags or the number of "major" flags are below a predefined threshold, and as a consequence the support test systems 305-2 to 305-4 may approve the software update for installation in the production system-1 310-1. Thus, in the examples described herein, after the software update is tested by the active test system, the results are verified for presence of errors by the support test systems. Although, in the present example, the software update for the production system-1 is considered, a similar technique is applicable mutatis mutandis for software updates in other production systems.

In response to approval of the software update, a test copy of a software hash stored in the active test system is updated based on the software update. In an example, once the software update for production system-1 310-1 is approved, a test copy of a software hash stored in the active test system-1 305-1 is updated based on the software update. In an example, updating the test copy of the software hash in the active test system-1 305-1 includes hashing a version/configuration information of the software update and storing the hashed value as the test copy.

In response to the test copy of the active test system being updated, the active test system may further update a central copy of the software hash based on the software update. In an example, once the software update of production system-1 310-1 is approved and the test copy of the software hash stored in the test system-1 305-1 is updated, the central copy of the software hash in the data center hash tree 315 is updated. As explained earlier, the central copy of the software hash is maintained as a leaf node of a data center hash tree 315. In an example, the data center hash tree 315 is stored in a distributed storage system.

Further, in response to approval of the software update, the active test system installs the software update in the production system. Thus, in the example, in response to approval of the software update, the active test system 305-1 may install the software update in the production system-1 310-1. The active test system 305-1 updates a production copy of the software hash 310-1a based on the software update. The production copy of the software hash 310-1a is stored in the production system-1 310-1.

Further, the active test system 305-1 checks that the test copy 305-1a, production copy 310-1a, and central copy 315-1a of the software hash of production system-1 is synchronized. In other examples, while processing a software update for production system 2, the active test system 305-2 may check that the test copy 305-2a, production copy 310-2a, and central copy 315-2a of the software hash of production system-2 is synchronized. Once the active test system determines that the test copy, production copy, and central copy of the software hash of the production system to which the software update relates is synchronized, the active tests system determines that the software update is successfully installed in the production system. In an example, if the test copy, production copy, and central copy of the software hash is not synchronized, the active test system 305-1 may determine that there is a failure in installation of the software update and in an example may reinitiate the installation.

Figure 4:
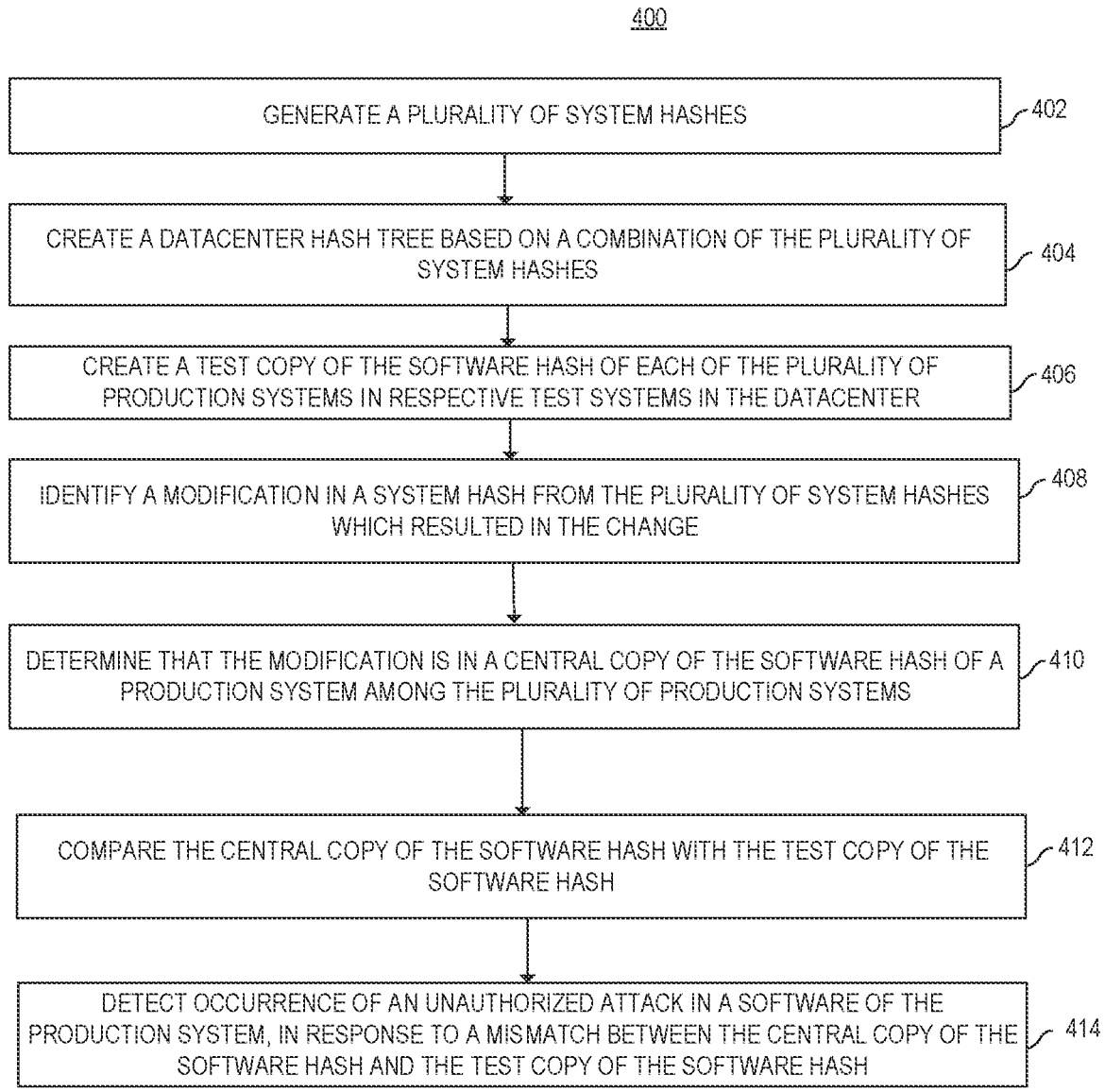
FIG. 4 is a flowchart of a method for securing a data center, according to an example.
Figure 5:
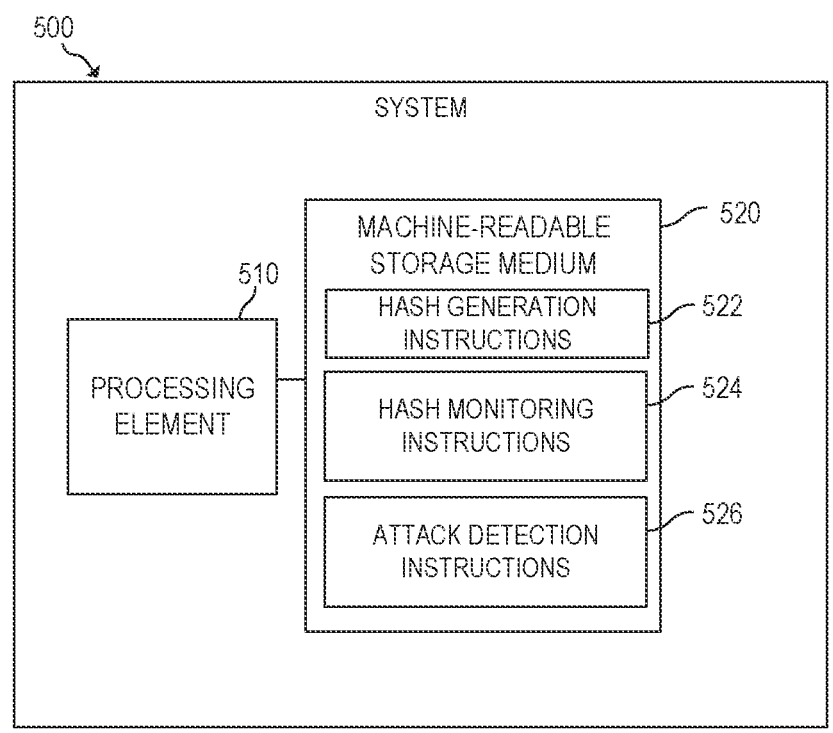
FIG. 5 is a block diagram of a device for securing a data center, according to an example.

FIG. 4 is a flowchart of a method 400 for securing a data center, according to an example. FIG. 5 is a block diagram of a device to perform operations for securing a data center, according to an example. Device 500 includes a processing element 510, and a machine-readable storage medium 520 including instructions 522, 524, and 526 for performing operations to secure a data center, such as the data center 300. Device 500 may include, for example, a distributed computing environment, such a compute node in a computing cluster. In example, one of the production systems 310 may also be configured to perform the functions of the device 500. The device 500 includes a processing element 510 and machine-readable storage medium 520.

Processing element 510 may be, one or multiple central processing unit (CPU), one or multiple semiconductor-based microprocessor, one or multiple graphics processing unit (GPU), other hardware devices suitable for retrieval and execution of instructions stored in machine-readable storage medium 520, or combinations thereof. The processing element 510 can be a physical device. Moreover, in one example, the processing element 510 may include multiple cores on a chip, include multiple cores across multiple chips, or combinations thereof. Processing element 510 may fetch, decode, and execute instructions 522 to 526 to implement operations for securing a data center. As an alternative or in addition to retrieving and executing instructions, processing element 510 may include at least one integrated circuit (IC), other control logic, other electronic circuits, or combinations thereof that include a number of electronic components for performing the functionality of instructions 522, 524, and 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for performing power management (e.g., for performing method 400).

Although execution of method 400 is described below with reference to device 500, other suitable components for execution of method 400 can be utilized. Method 400 may be implemented in the form of executable instructions stored on a machine-readable storage medium, such as storage medium 520, and/or in the form of electronic circuitry.

At 402, the processing element 510 may execute hash generation instructions 522 to generate a plurality of system hashes, each of which includes a concatenation of a hardware hash and a software hash of each of a plurality of production systems, such as production systems 310 in the data center, such as the data center 300.

At 404, the processing element 510 may execute hash generation instructions 522 to create a data center hash tree, such as the data center hash tree 112, 200, or 315. The data center hash tree is created based on a combination of the plurality of system hashes. The data center hash tree includes a central copy of the software hash and a central copy of the hardware hash of each of the plurality of production systems. The central copy of the software hash and the central copy of the hardware hash of each of the production systems form leaf nodes of the data center hash tree.

At 406, the processing element 510 may execute hash generation instructions 522 to create a test copy of the software hash of each of the plurality of production systems, such as production systems 310, in respective test systems, such as test systems 305-1, 305-2, 305-3, and 305-4, in the data center, such as data center 300.

At 408, the processing element 510 may execute hash monitoring instructions 524 to identify a modification in a system hash from the plurality of system hashes which resulted in a change in the data center hash tree. At 410, the processing element 510 may execute hash monitoring instructions 524 to determine that the modification is in a central copy of the software hash of a production system among the plurality of production systems.

At 412, the processing element 510 may execute attack detection instructions 526 to compare the central copy of the software hash with the test copy of the software hash. At 414, the processing element 510 may execute attack detection instructions 526 to detect occurrence of an unauthorized attack in a software of the production system, in response to a mismatch between the central copy of the software hash and the test copy of the software hash.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

I claim:

1. A system for securing a data center, comprising:
   a processing element; and
   a memory coupled to the processing element, the memory storing instructions executable by the processing element to:
   generate a plurality of system hashes, each of which includes a concatenation of a hardware hash and a software hash of each of a plurality of production systems in the data center;
   create a data center hash tree based on a combination of the plurality of system hashes, wherein the data center hash tree includes a central copy of the software hash and a central copy of the hardware hash of each of the plurality of production systems, wherein the central copy of the software hash and the central copy of the hardware hash of each of the production systems form leaf nodes of the data center hash tree;
   create a test copy of the software hash of each of the plurality of production systems in respective test systems in the data center;
   in response to detecting a change in the data center hash tree, identify a modification in a system hash from the plurality of system hashes which resulted in the change;
   determine whether the modification is in a central copy of the hardware hash of a production system among the plurality of production systems;
   determine that the modification is in a central copy of the software hash of a production system among the plurality of production systems;
   compare the central copy of the software hash with the test copy of the software hash; and
   detect occurrence of an unauthorized attack in a software of the production system, in response to a mismatch between the central copy of the software hash and the test copy of the software hash.

2. The system of claim 1, further comprising instructions executable by the processing element to:
   determine that the change is authorized, in response to a match between the central copy of the software hash and the test copy of the software hash; and
   approve the change.

3. The system of claim 1, further comprising instructions executable by the processing element to:
   responsive to determining that the modification is in the central copy of the hardware hash, determine occurrence of an unauthorized attack to hardware of the data center.

4. The system of claim 1, wherein the software hash of each of the plurality of production systems is indicative of a cryptographic hash of software information of the production system.

5. The system of claim 1, wherein the hardware hash of each of the plurality of production systems is indicative of a cryptographic hash of hardware information of the production system.

6. The system of claim 1, wherein the plurality of production systems include a server, a network device, and an IoT device.

7. The system of claim 1, further comprising instructions executable by the processing element to monitor the data center hash tree for detection of the change in the data center hash tree.

8. The system of claim 1, further comprising instructions executable by the processing element to create a production copy of the software hash of each of the plurality of production systems, wherein the production copy is stored in respective production systems in the data center.

9. A method for securing a data center, comprising:
   generating a plurality of system hashes, each of which includes a concatenation of a hardware hash and a software hash of each of a plurality of production systems in the data center;
   creating a data center hash tree based on a combination of the plurality of system hashes, wherein the data center hash tree includes a central copy of the software hash and a central copy of the hardware hash of each of the plurality of production systems, wherein the central copy of the software hash and the central copy of the hardware hash of each of the production systems form leaf nodes of the data center hash tree;

creating a test copy of the software hash of each of the plurality of production systems in respective test systems in the data center;

in response to detecting a change in the data center hash tree, identifying a modification in a system hash from the plurality of system hashes which resulted in the change;

determining whether the modification is in a central copy of the hardware hash of a production system among the plurality of production systems;

determining that the modification is in a central copy of the software hash of a production system among the plurality of production systems;

comparing the central copy of the software hash with the test copy of the software hash; and detecting occurrence of an unauthorized attack in a software of the production system, in response to a mismatch between the central copy of the software hash and the test copy of the software hash.

10. The method of claim 9, further comprising:

determining that the change is authorized, in response to a match between the central copy of the software hash and the test copy of the software hash; and approving the change.

11. The method of claim 9, further comprising:

responsive to determining that the modification is in the central copy of the hardware hash, determining occurrence of an unauthorized attack to hardware of the data center.

12. The method of claim 9, wherein the software hash of each of the plurality of production systems is indicative of a cryptographic hash of software information of the production system.

13. The method of claim 9, wherein the hardware hash of each of the plurality of production systems is indicative of a cryptographic hash of hardware information of the production system.

14. The method of claim 9, wherein the plurality of production systems include a server, a network device, and an IoT device.

15. The method of claim 9, further comprising monitoring the data center hash tree to detect the change in the data center hash tree.

16. The method of claim 9, further comprising creating a production copy of the software hash of each of the plurality of production systems, wherein the production copy is stored in respective production systems in the data center.

* * * * *